United States Patent
Oh et al.

(10) Patent No.: US 9,501,127 B2
(45) Date of Patent: Nov. 22, 2016

(54) LOW POWER DETECTION APPARATUS AND METHOD FOR DISPLAYING INFORMATION

(71) Applicant: Samsung Electronics Co. Ltd., Suwon-si, Gyeonggi-do (KR)

(72) Inventors: Ji-Heon Oh, Gwacheon-si (KR); Hyun-Su Hong, Seongnam-si (KR); Sung-Min Park, Seoul (KR); Jae-Myeon Lee, Yongin-si (KR); Hyun-Ki Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 14/012,288

(22) Filed: Aug. 28, 2013

(65) Prior Publication Data
US 2014/0068306 A1    Mar. 6, 2014

(30) Foreign Application Priority Data

Aug. 28, 2012 (KR) .......... 10-2012-0094066
Aug. 7, 2013  (KR) .......... 10-2013-0093602

(51) Int. Cl.
G06F 1/32   (2006.01)

(52) U.S. Cl.
CPC .......... G06F 1/3231 (2013.01); G06F 1/3206 (2013.01); Y02B 60/1289 (2013.01)

(58) Field of Classification Search
CPC  G06F 1/3206; G06F 1/3231; Y02B 60/1289
USPC .................. 713/300, 320; 715/200
See application file for complete search history.

(56) References Cited

U.S. PATENT DOCUMENTS

| | | | |
|---|---|---|---|
| 5,996,080 A * | 11/1999 | Silva et al. .......... | 713/320 |
| 7,010,710 B2 * | 3/2006 | Piazza .......... | 713/323 |
| 7,865,831 B2 * | 1/2011 | Dooley et al. ........ | 715/719 |
| 8,957,863 B2 * | 2/2015 | Polak et al. .......... | 345/170 |
| 2006/0166702 A1 * | 7/2006 | Dietz et al. .......... | 455/566 |
| 2009/0195497 A1 | 8/2009 | Fitzgerald et al. | |
| 2009/0239591 A1 * | 9/2009 | Alameh .......... | H04M 1/05 455/574 |
| 2010/0095206 A1 | 4/2010 | Kim | |
| 2010/0289740 A1 | 11/2010 | Kim et al. | |
| 2010/0313050 A1 | 12/2010 | Harrat et al. | |
| 2014/0362042 A1 * | 12/2014 | Noguchi et al. ........ | 345/174 |

FOREIGN PATENT DOCUMENTS

| | | |
|---|---|---|
| EP | 1785808 A1 | 5/2007 |
| JP | 2011-139301 A | 7/2011 |
| KR | 10-2010-0124113 A | 11/2010 |
| KR | 10-2011-0121932 A | 11/2011 |

* cited by examiner

*Primary Examiner* — Mark Connolly
(74) *Attorney, Agent, or Firm* — Jefferson IP Law, LLP

(57) ABSTRACT

A low power detection apparatus and a method for displaying information are provided. When a low power manager drives a proximity detection sensor to generate a proximity interrupt in a state within which the portable terminal is in an idle state, the low power manager drives a motion detection sensor and determines a motion of the portable terminal for a preset time. When there is no motion of the portable terminal for the preset time, the low power manager generates proximity data for displaying screen information and then transmits the generated proximity data to an application processor so as to display screen information which the user desires with low power.

13 Claims, 7 Drawing Sheets

LOW POWER DETECTION APPARATUS AND METHOD FOR DISPLAYING INFORMATION

CROSS-REFERENCE TO RELATED APPLICATION(S)

This application claims the benefit under 35 U.S.C. §119 (a) of a Korean patent application filed on Aug. 28, 2012 in the Korean Intellectual Property Office and assigned Serial No. 10-2012-0094066, and a Korean patent application filed on Aug. 7, 2013 in the Korean Intellectual Property Office and assigned Serial No. 10-2013-0093602, the entire disclosure of each of which is hereby incorporated by reference.

TECHNICAL FIELD

The present disclosure relates to a low power detection apparatus and method. More particularly, the present disclosure relates to a low power detection apparatus and method which detect an approach of a body part or an object and display preset screen information with low power when a portable terminal is in an idle state.

BACKGROUND

In general, when a user desires to identify simple information of a portable terminal, the user presses a power on button of the portable terminal to switch a state of the portable terminal from an idle state to an active state. Thereafter, the portable terminal of which the state is switched to the active state displays, for example, a battery state, a charging state, a current time, an unchecked message, an unchecked call, currently played music information, content download information, or the like. Accordingly, the user can identify (e.g., determine) the simple information displayed on the screen of the portable terminal in the active state.

Further, the portable terminal includes a proximity detection sensor for detecting an approach of a user's body or an object. When detecting the approach of the user's body or the object, the portable terminal displays simple information on a screen thereof. Through the display, the user can conveniently identify simple information of the portable terminal without pressing the power on button of the portable terminal.

As described above, when the user desires to identify simple information of the portable terminal, the user switches an operation state of the portable terminal from the idle state to the active state by using the power on button or the proximity sensor and displays the simple information on the screen of the portable terminal of which the state is switched to the active state.

However, in the related art, the requirement that the user has to press the power on button of the portable terminal whenever the user desires to identify simple information of the portable terminal adds an element of inconvenience to the user and makes the identification of simple information of the portable terminal inconvenient.

Further, in the related art, there is a problem in which the portable terminal continuously consumes power to maintain the active state because the proximity detection sensor of the portable terminal detects the approach of the user's body or the object while continuously operating.

In addition, in the related art, there is a disadvantage associated with reducing an entire idle time of the portable terminal as a result of frequent state switching because the user switches the state of the portable terminal from the idle state to the active state even when the proximity detection sensor of the portable terminal detects the approach which the user does not want to detect. For example, the user may inadvertently switch the state of the portable terminal from the idle state to the active state based on a detection by the proximity detection sensor.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a low power detection apparatus and method which detect an approach which the user desires and display preset screen information with lower power.

In accordance with an aspect of the present disclosure, a low power detection apparatus for displaying information is provided. The low power detection apparatus includes a detection sensor that detects at least one of an approach to a portable terminal and a motion of the portable terminal, and a low power manager that determines a motion of the portable terminal for a preset time when the approach to the portable terminal is detected by the detection sensor, and outputs data on the detected approach when there is no motion of the portable terminal for the preset time.

In accordance with another aspect of the present disclosure, a detection method of displaying information in a low power detection apparatus is provided. The detection method includes determining whether an approach to a portable terminal is detected by a detection sensor configured to detect at least one of the approach to the portable terminal and a motion of the portable terminal, determining the motion of the portable terminal for a preset time when the approach to the portable terminal is detected, and outputting data on the detected approach when there is no motion of the portable terminal for the preset time.

In accordance with another aspect of the present disclosure, a portable terminal configured to display information is provided. The portable terminal includes a detection sensor which includes a proximity detection sensor configured to detect an approach of an object to the portable terminal, and a motion detection sensor configured to detect a motion of the portable terminal, and a low power manager configured to control operation of the detection sensor based on whether the proximity detection sensor detects an approach, and whether the motion detection sensor detects that the portable terminal is moved for time relative to a preset time threshold.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As a non-exhaustive illustration only, a portable terminal described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and the like capable of wireless communication or network communication consistent with that disclosed herein.

According to various embodiment of the present disclosure, when a low power manager drives a proximity detection sensor to generate a proximity interrupt in a state in which the portable terminal is in an idle state, the low power manager drives a motion detection sensor and determines a motion of the portable terminal for a preset time. When the low power manager determines that the portable terminal has no motion for the preset time (e.g., when the portable terminal is not moved for the preset time), the low power manager generates proximity data for displaying screen information and then transmits the generated proximity data to an application processor so as to display screen information which the user desires with lower power.

Figure 1:
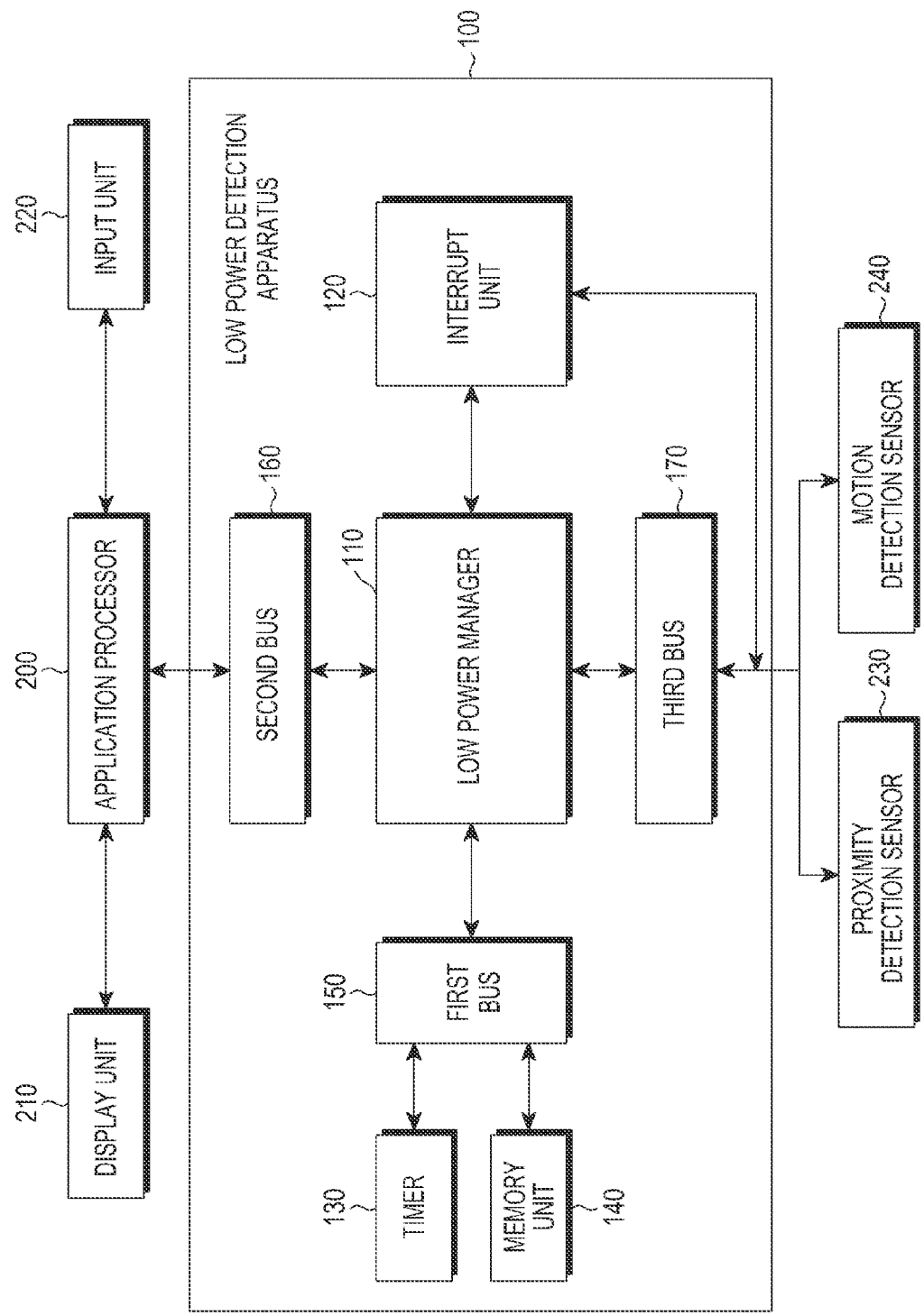
FIG. 1 illustrates a configuration of a low power detection apparatus according to an embodiment of the present disclosure.

FIG. 1 illustrates a configuration of a low power detection apparatus according to an embodiment of the present disclosure;

Referring to FIG. 1, the portable terminal includes a lower power detection apparatus 100, an application processor 200, a display unit 210, an input unit 220, a proximity detection sensor 230, and a motion detection sensor 240.

According to various embodiments of the present disclosure, the low power detection apparatus 100 includes a low power manager 110, an interrupt unit 120, a timer 130, a memory unit 140, a first bus 150, a second bus 160, and a third bus 170.

The low power manager 110 controls a general operation of the lower power detection apparatus 100. For example, the low power manager 110 drives the proximity detection sensor 230 in a state in which the application processor 200 is in a sleep mode, and drives the motion detection sensor 240 when detecting generation of a proximity interrupt from the interrupt unit 120.

The low power manager 110 determines whether a posture (e.g., positioning) of the portable terminal satisfies a preset determination condition through the motion detection sensor 240. The preset determination condition refers to a condition that determines angles of x, y, and z axes of the portable terminal are within a preset threshold range. According to various embodiments of the present disclosure, the motion detection sensor 240 may be an acceleration sensor and calculate a rotation angle of the portable terminal having rotated in a horizontal direction. The portable terminal (e.g., the motion detection sensor 240) may determine whether the calculated rotation angle is within a preset threshold range. When the rotation angle is within the preset threshold range, the low power manager 110 determines that the rotation angle satisfies the preset determination condition. When the rotation angle is not within the preset threshold range, the low power manager 110 determines that the rotation angle does not satisfy the preset determination condition. For example, when the rotation angle of the portable terminal having rotated in the horizontal direction is 0 degrees, if such a rotation angle is included within the preset threshold range, the low power manager 110 may determine that the rotation angle satisfies the preset determination condition.

When the posture (e.g., positioning) of the portable terminal satisfies the preset determination condition, the low power manager 110 determines whether a detection signal identified as a motion is included in a detection signal input from the motion detection sensor 240 for a preset time.

When the posture (e.g., positioning) of the portable terminal does not satisfy the preset determination condition, the low power manager 110 stops the driving of the motion detection sensor and waits for the generation of a next proximity interrupt. Accordingly, various embodiments of the present disclosure can prevent the state of the portable terminal from being switched from the idle state to the active state in situations other than the proximity situation.

In other words, when the portable terminal (e.g., the low power manager 110) determines that that the detection signal identified as the motion is included in the detection signal input from the motion detection sensor 240 for the preset time, the low power manager 110 stops the driving of the motion detection sensor 240 and waits for the generation of the next proximity interrupt.

When the detection signal identified as the motion is not included in the detection signal input from the motion detection sensor 240 for the preset time, the low power manager 110 determines whether the preset time has passed.

A process in which the low power manager 110 determines a motion from the detection signal received from the motion sensor will be described in detail with reference to FIG. 2.

Figure 2:
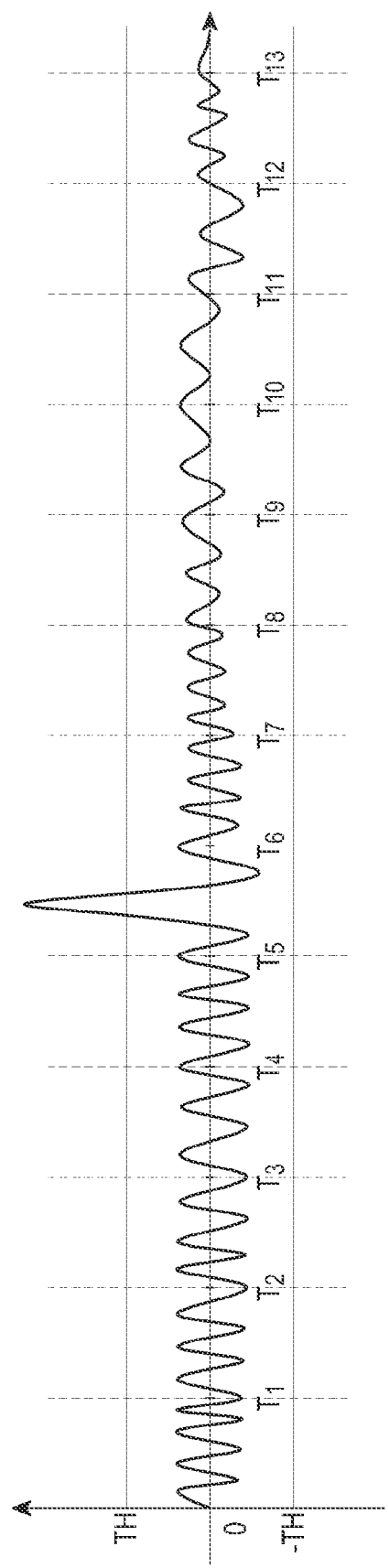
FIG. 2 illustrates an example of a motion detection signal which a low power manager of a low power detection apparatus receives from a motion detection sensor according to an embodiment of the present disclosure.

FIG. 2 illustrates an example of a motion detection signal which the low power manager of the low power detection apparatus receives from the motion detection sensor according to an embodiment of the present disclosure.

Referring to FIG. 2, the low power manager 110 divides a preset time section for a motion determination into the preset number of sections and determines whether a detection signal input for each of the divided time sections has a value larger than or equal to a preset threshold TH. The low power manager 110 determines whether the portable terminal is moving (e.g., an occurrence of a motion) when the detection signal is larger than or equal to the threshold, and determines whether the portable terminal is not moving (e.g., an absence of portable terminal motion) when the detection signal is smaller than the threshold. Further, the preset time section refers to a minimum time used for determining a motion by the motion detection sensor 240.

When a detection signal is larger than or equal to the threshold in a particular divided time section, the low power manager 110 divides a preset time section from a next divided time section into the preset number of sections and determines again whether a detection signal input for each of the divided time sections is larger than or equal to the threshold. The low power manager 110 may determine a divided time section in which a motion is detected by comparing a previous divided time section and a current divided time section.

For example, the low power manager 110 divides a preset time section T10 into ten time sections and determines whether a detection signal input into each of the ten divided time sections 0~T1, T1~T2, T2~T3, T3~T4, T4~T5, T5~T6, T6~T7, T7~T8, T8~T9, and T9~T10 is larger than or equal to the threshold TH. When the divided time section T5~T6 has a value larger than or equal to the threshold, the low power manager 110 determines that the motion has been detected. Thereafter, the low power manager 110 divides again a preset time section T after the divided time section in which the motion has been detected into ten time sections and determines whether a detection signal input into each of the ten divided time sections is larger than or equal to the threshold TH.

When the motion is continuously detected within a preset time section, the low power manager 110 stops the driving of the motion detection sensor and waits for the generation of a next proximity interrupt.

When the motion is not detected within a preset time section, the low power manager 110 transmits proximity data for displaying screen information stored in the memory unit 140 to the application processor 200 and stops the driving of the motion detection sensor 240 and the proximity detection sensor 230.

The application processor 200 having received the proximity data displays screen information preset by the user on the display unit 210. Specifically, the application processor 200 may display, on the display unit 210, screen information including terminal information, such as a current time of the portable terminal, an unanswered call, an unanswered message, a battery remainder, music which is being played, and/or the like. The terminal information may further include information related to an alarm time, which corresponds to an alarm time and the remaining time from the current time to the alarm time. The application processor 200 may provide the alarm when the remaining time is shorter than a preset time.

According to various embodiments of the present disclosure, the portable terminal may display the screen information and the state thereof may be switched to the idle state when a preset time passes.

Further, although the portable terminal provides the terminal information through a text or an image screen according to various embodiments of the present disclosure, the terminal information may be provided using a voice. For example, according to various embodiments of the present disclosure, the application processor 200 may configure the terminal information by a text or image screen, and display the configured text or image screen, and configure the terminal information by voice data and output the configured voice data. According to other embodiments of the present disclosure, the application processor 200 may configure the terminal information by only the voice data, and output the configured voice data without a separate screen display. For example, when information related to the alarm is output by the voice data, the application processor 200 may control a volume of the output voice data in consideration of conditions such as a current time, the remaining time from the current time to the alarm time, and ambient brightness.

The interrupt unit 120 detects an interrupt generated from the proximity detection sensor 230 or the motion detection sensor 240 and transmits the detected interrupt to the low power manager 110.

The timer 130 counts a number at particular time intervals.

The memory 140 pre-stores proximity data used for displaying screen information. The proximity data is stored such that the proximity data corresponds to the preset screen information.

The first bus 150 is an interface that connects the low power manager 110, the timer 130, and the memory unit 140.

The second bus 160 is an interface that connects the low power manager 110 and the application processor 200.

The third bus 170 is an interface that connects the low power manager 110, the proximity detection sensor 230, and the motion detection sensor 240.

The application processor 200 controls a generation operation of the portable terminal, and particularly, displays preset screen information on the display unit 210 when receiving proximity data from the low power manager 200.

The display unit 210 may be implemented by a Liquid Crystal Display (LCD) or the like and visually provides a menu of the portable terminal, input data, function setting information and other various pieces of information to the user. According to various embodiments of the present disclosure, the display unit 210 may include various devices in addition to the LCD. The display unit 210 performs a function of outputting a booting screen, an idle screen, a display screen, a call screen, and other application execution screens.

The input unit 220 may include a key input means including a plurality of keys for a key input, a pointing input means for a pointing input such as a mouse, and a touch input means for a touch input, and/or the like. The input unit 220 transmits an input signal received through the means to the application processor 200.

The proximity detection sensor 230 outputs a detection signal when a user's body or an object approaches before the contact. For example, the proximity sensor 230 may use an infrared, laser, ultrasonic, or illumination sensor, a capacitive type touch screen, and/or the like.

The motion detection sensor 240 may detect a motion of a person or an object to output a detection signal. For example, the motion detection sensor 240 may use an acceleration sensor, a gyro sensor, an earth magnetic sensor, a gravity sensor, and/or the like.

Further, according to various embodiments of the present disclosure, the low power detection apparatus 100 further includes a sensor configured to detect an ambient environment. The sensor may detect only an effective operation for switching a state of the application processor from the idle state to the active state.

As described above, although an example described according to which the low power detection apparatus 100 is implemented separately from the application processor 200, according to various embodiments of the present disclosure, the low power detection apparatus 100 may be included in a sub core within the application processor 200. In other words, the sub core for the low power detection application 100 may be added to the application processor 200, and the application processor 200 may communicate between the low power detection apparatuses 100 through a bus, a register, or the like.

According to various embodiments of the present disclosure as described above, when an event for activating the portable terminal in the idle state is detected, a posture (e.g., positioning) of the portable terminal is determined. When the determined posture (e.g., positioning) of the portable terminal satisfies a condition of activating the portable terminal, the portable terminal is activated.

According to various embodiments of the present disclosure, the portable terminal may determine whether the portable terminal is connected to a holder or whether the portable terminal in the idle state executes a particular application through a background to display screen information associated with the determination.

First, a process of displaying screen information according to whether the portable terminal is connected to the holder will be described. The low power manager 110 determines whether the portable terminal is connected to the holder in a sleep mode. When the portable terminal is connected to the holder, the low power manager 110 switches a state of the portable terminal from the sleep mode to the active mode. Thereafter, the low power manager 110 drives the proximity detection sensor 240 to determine whether a proximity interrupt is generated. When the proximity interrupt is generated, the low power manager 110 transmits proximity data to the application processor 200. The application processor 200 configures a screen for voice recognition and displays the configured screen on the display unit 210 in a voice recognition mode for controlling a function of the portable terminal through the voice recognition. For example, when a connection with a holder within a vehicle is recognized, the low power manager 110 may switch a state of the portable terminal to a driving mode for vehicle driving by the user.

Further, when a connection between a dock holder of a music play device and the portable terminal in a music play mode in which music is being played is recognized, the low power manager 110 drives the proximity detection sensor 240 and determines whether a proximity interrupt is generated. When the connection with the holder is not recognized, the low power manager 110 maintains the music play mode.

When the proximity interrupt is generated, the low power manager 110 transmits the proximity data to the application processor 200, and the application proximity processor 200 may configure a screen related to the music which is being played and display the configured screen on the display unit 210. The screen related to the music which is being played may include music information such as an artist and lyrics of the music, an interface for controlling music play, and/or the like. When the proximity interrupt is not generated, the low power manager 110 may continuously determine whether the proximity interrupt is generated.

Subsequently, a process of displaying the screen information according to whether the portable terminal in the idle state executes a particular application through a background will be described in detail. When a preset time passes while the application processor 200 executes a particular application, a state of the portable terminal is switched to the sleep mode. The particular application may be an executable application through the background such as an application for a data upload or download.

The low power manager 110 drives the proximity detection sensor 240 to determine whether the proximity interrupt is generated. When the proximity interrupt is generated, the low power manager 110 configures a screen related to an application which is being executed through the background and displays the configured screen on the display unit 210. The screen related to the application which is being executed through the background may include progress status information such as a time for the data upload or download and a data capacity when the application is an application for data transmission/reception between one smart phone and another smart phone.

Accordingly, the portable terminal may display preset screen information with low power by detecting only an effective operation for displaying screen information which the user desires.

Figure 3:
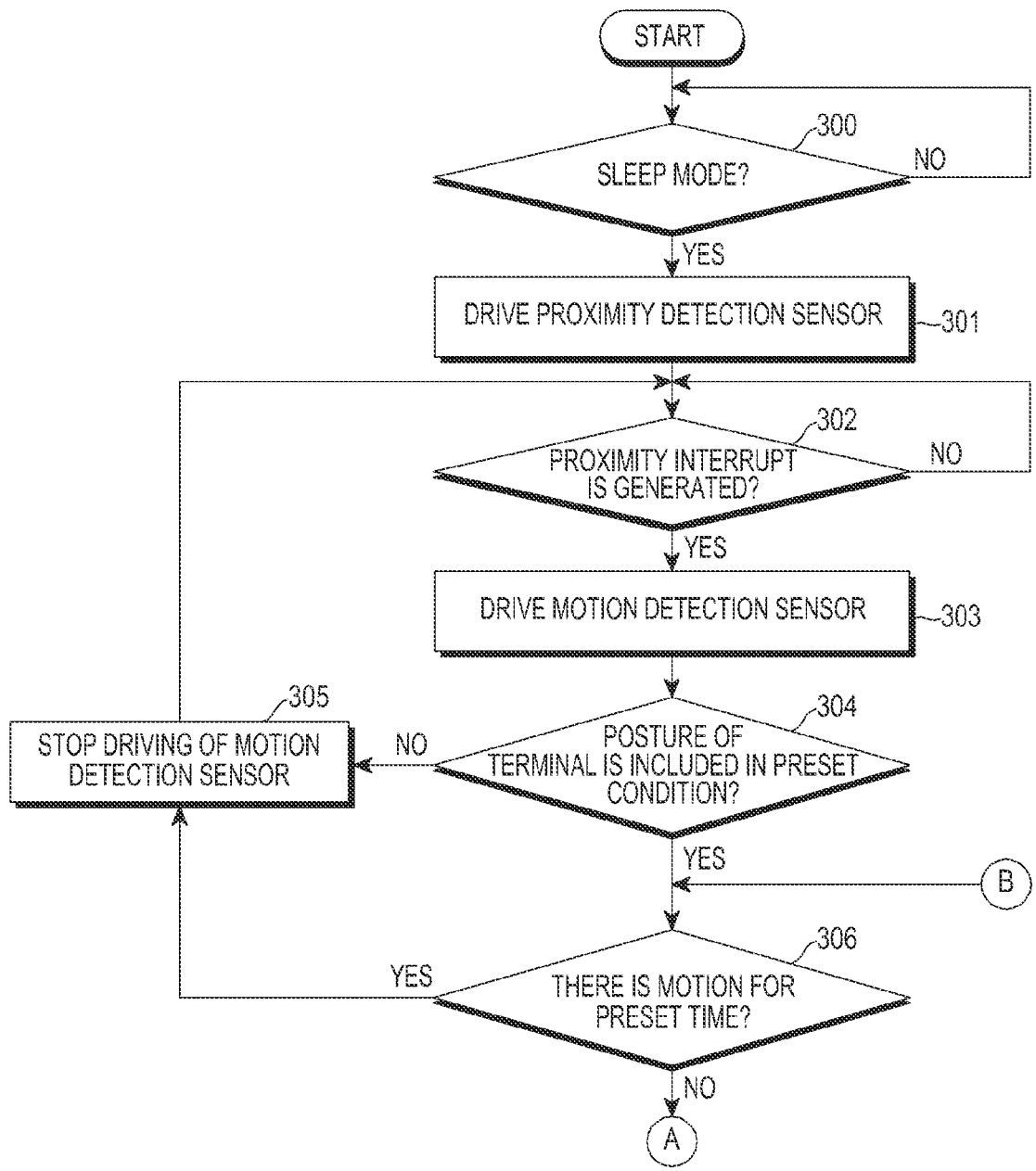
FIGS. 3 and 4 are flowcharts illustrating a process in which a low power detection apparatus displays preset screen information through a proximity detection and a motion detection according to an embodiment of the present disclosure.
Figure 4:
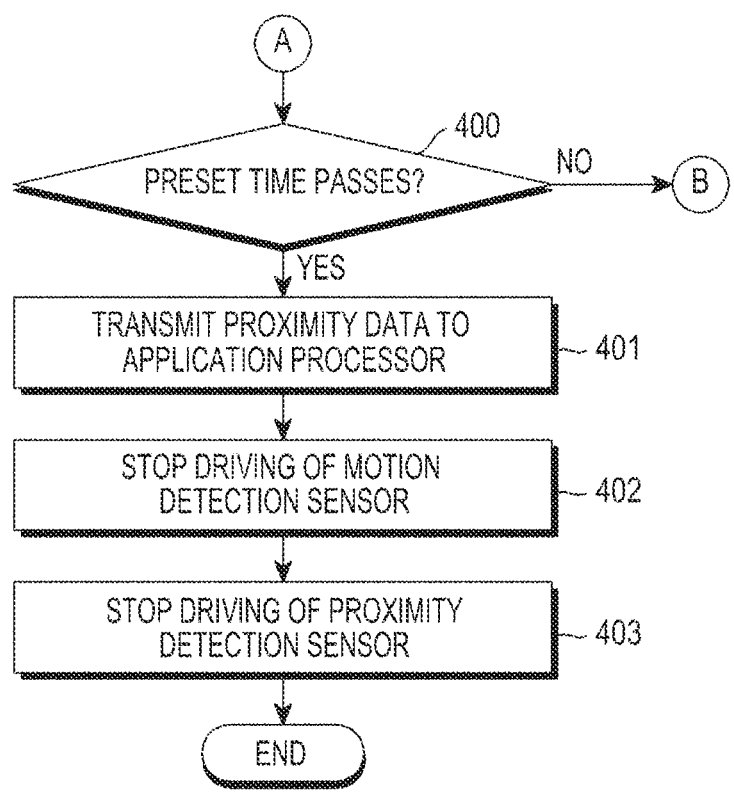

FIGS. 3 and 4 are flowcharts illustrating a process in which the low power detection apparatus displays preset screen information through a proximity detection and a motion detection according to an embodiment of the present disclosure.

Referring to FIG. 3, at operation 300, the low power manager 110 determines whether the application processor 200 is in a sleep mode.

If the low power manager 110 determines that the application processor 200 is in the sleep mode at operation 300, then the low power manager 110 proceeds to operation 301.

Otherwise, if the low power manager 110 determines that the application processor is not in the sleep mode at operation 300, then the low power manager 110 may continuously determine whether the application processor 200 is in the sleep mode at operation 300. For example, the low power manager 110 may continue to poll for an indication that the application 200 is in (or enters) the sleep mode.

At operation 301, the low power manager 110 drives the proximity detection sensor 230.

At operation 302, the low power manager 110 determines whether a proximity interrupt is generated through the interrupt unit 120.

If the low power manager 110 determines that the proximity interrupt is generated at operation 302, then the low power manager 110 proceeds to operation 303 at which the low power manager 110 drives the motion detection sensor 240.

In contrast, if the low power manager 110 determines that the proximity interrupt is not generated at operation 302, then the low power manager 110 may continuously determine whether the proximity interrupt is generated 302. For example, the low power manager may continue to poll for an indication that the proximity interrupt is generated.

At operation 304, the low power manager 110 determines whether a posture (e.g., positioning) of the portable terminal is included in a preset determination condition through the motion detection sensor.

If the low power manager 110 determines that the posture (e.g., positioning) is included in the preset determination condition at operation 304, then the low power manager 110 proceeds to operation 306.

In contrast, if the low power manager 110 determines that the posture (e.g., positioning) is not included in the preset determination condition at operation 304, then the low power manager 110 proceeds to operation 305 at which the low power manager 110 stops the driving of the motion detection sensor 240. Thereafter, the low power manager 110 proceeds to operation 302 at which the low power manager 110 determines whether a next proximity interrupt is generated. Thereafter, the low power manager 110 proceeds to operations 303 and 304 and performs the corresponding operations.

At operation 306, the low power manager 110 determines whether a motion occurs (e.g., is detected) for a preset time. For example, the low power manager 110 determines whether a detection signal identified as a motion is included in a detection signal input from the motion detection sensor 240.

If the low power manager 110 determines that a motion occurs for the preset time at operation 306, then the low power manager 110 proceeds to operation 305 at which the low power manager 110 stops the driving of the motion detection sensor 240, and thereafter, the low power manager 110 proceeds to operation 302 at which the low power manager 110 determines whether the next proximity interrupt is generated. Thereafter, the low power manager 110 proceeds to operations 303 and 304 and performs the corresponding operations.

In contrast, if the low power manager 110 determines that a motion does not occurs for the preset time at operation 306, then the low power manager 110 proceeds to operation A and performs succeeding operations of operation A as illustrated in FIG. 4.

Referring to FIG. 4, at operation 400, the low power manager 110, having proceeded to operation 400 from operation A, determines whether the preset time has passed.

Figure 6:
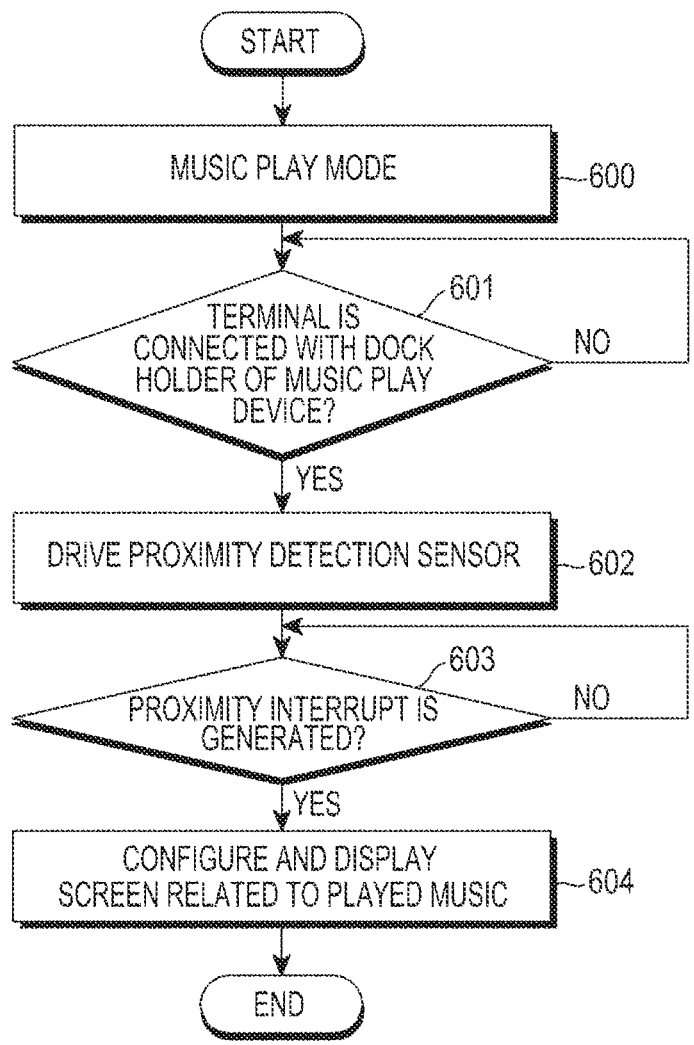

If the low power manager 110 determines that the preset time has not passed at operation 400, then the low power manager proceeds to operation B of FIG. 3 at which the low power manager performs operation 306 illustrated in FIG. 6. For example, at operation 306, the low power manager 110 determines whether a motion occurs for a preset time.

In contrast, if the low power manager 110 determines that the preset time has passed at operation 400, then the low power manger 110 proceeds to operation 401 at which the low power manager 110 transmits proximity data for displaying screen data to the application processor 200.

At operation 402, the low power manager 110 stops the driving of the motion detection sensor 230.

At operation 403, the low power manager 110 stops the driving of the proximity detection sensor 240. Thereafter, the low power manager 110 ends the proximity data transmitting process by the proximity detection.

Figure 5:
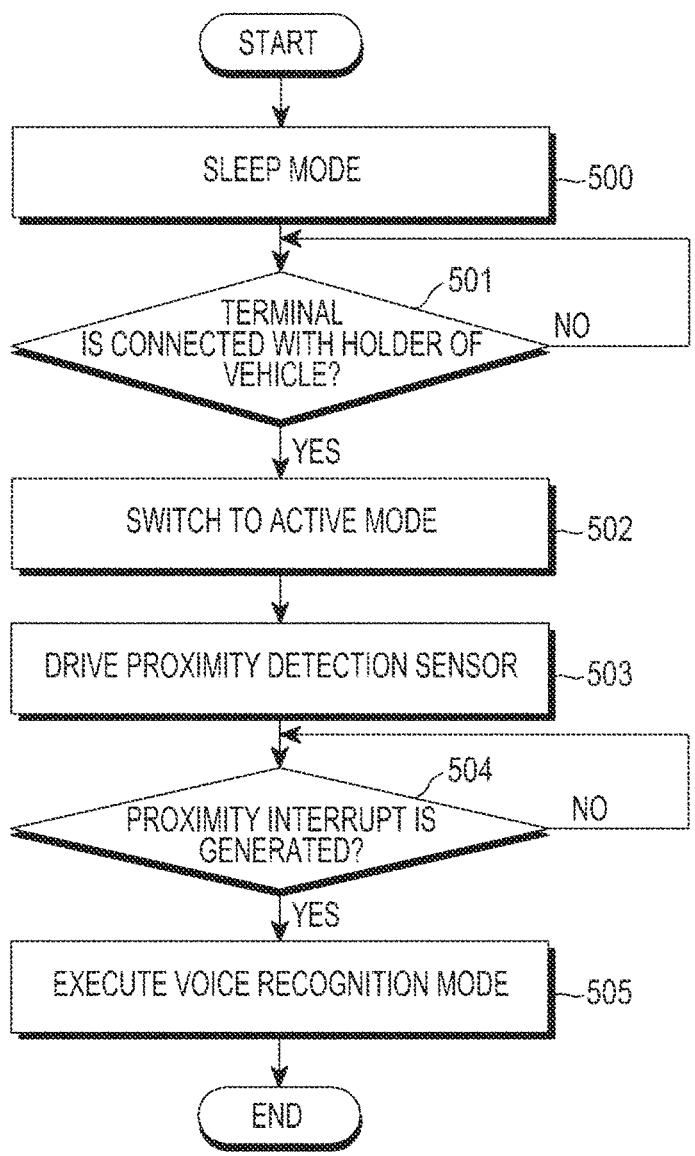
FIGS. 5, 6, and 7 are flowcharts illustrating a process of displaying screen information according to an embodiment of the present disclosure.
Figure 7:
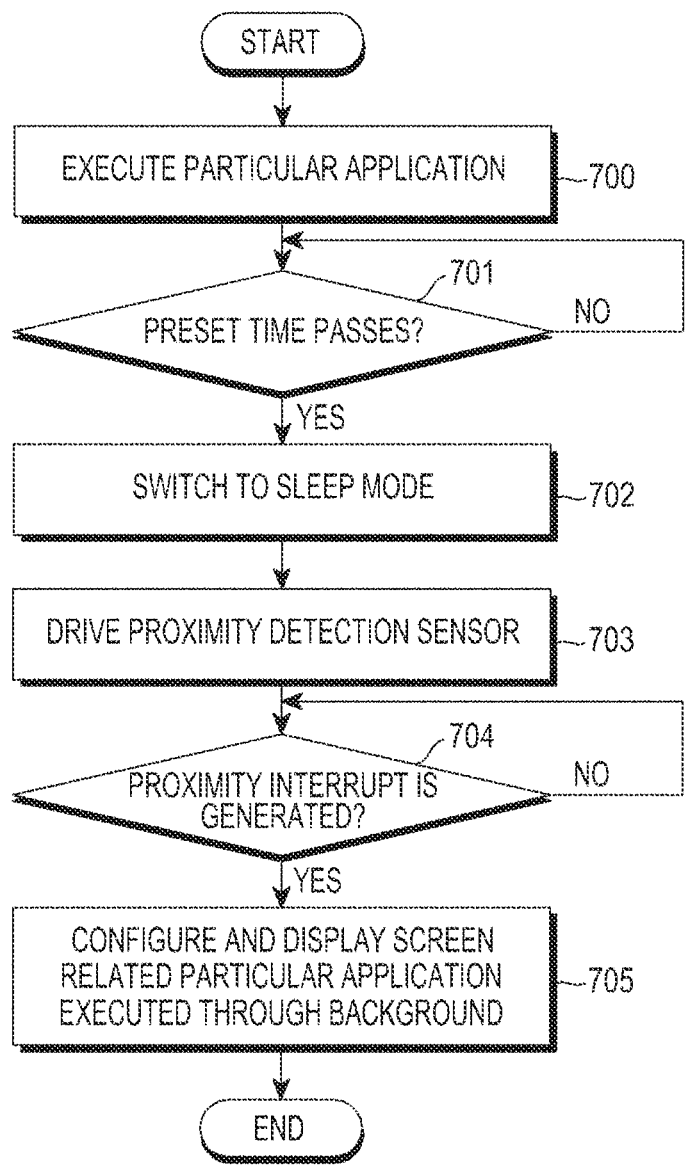

FIGS. 5, 6, and 7 are flowcharts illustrating a process of displaying screen information according to an embodiment of the present disclosure.

Referring to FIG. 5, a flowchart illustrating a process of displaying a screen according to whether the portable terminal is connected with a holder of a vehicle according to an embodiment of the present disclosure is provided.

At operation 500, the portable terminal is in a state within which the portable terminal is in a sleep mode.

At operation 501, the low power manager 110 determines whether the portable terminal is connected with a holder of a vehicle.

If the low power manager 110 determines that the portable terminal is connected with the holder of the vehicle at operation 501, then the low power manager 110 proceeds to operation 502.

In contrast, if the low power manager 110 determines that the portable terminal is not connected with the holder of the vehicle at operation 501, then the low power manager 110 may continuously determine whether the portable terminal is connected with the holder of the vehicle. For example, the low power manager may poll for an indication that the portable terminal is connected with the holder of the vehicle.

At operation 502, the low power manager 110 switches a state of the portable terminal to an active mode.

At operation 503, the low power manager 110 drives the proximity detection sensor 240.

At operation 504, the low power manager 110 determines whether a proximity interrupt is generated.

If the low power manager 110 determines that the proximity interrupt is generated at operation 504, then the low power manager 110 proceeds to operation 505 at which the application processor 200 executes a voice recognition mode 505.

In contrast, if the low power manager 110 determines that the proximity interrupt is not generated at operation 504, then the low power manager 110 may continuously determine whether the proximity interrupt is generated at operation 504. More specifically, when the proximity interrupt is generated, the low power manager 110 transmits proximity data for executing the voice recognition mode to the application processor 200. Thereafter, the application processor 200 executes the voice recognition mode in which the portable terminal is controlled through the recognition of a user's voice.

Referring to FIG. 6, a flowchart illustrating a process of displaying a screen according to whether the portable terminal is connected with a dock holder of a music play device when music is being played according to an embodiment of the present disclosure is provided.

At operation 600, the portable terminal is in a state within which the portable terminal is in a music play mode 600.

At operation 601, the low power manager 110 determines whether the portable terminal is connected with a dock holder of a music play device.

If the low power manager 110 determines that the portable terminal is connected with the dock holder of the music play device at operation 601, the low power manager 110 proceeds to operation 602.

In contrast, if the low power manager 110 determines that the portable terminal is not connected with the dock holder of the music play device at operation 601, the low power manager 110 may continuously determine whether the portable terminal is connected with the dock holder of the music play device. For example, the low power manager 110 may poll for an indication that the portable terminal is connected with the dock holder of the music play device.

At operation 602, the low power manager 110 drives the proximity detection sensor 240.

At operation 603, the low power manager 110 determines whether a proximity interrupt is generated.

If the low power manager 110 determines that the proximity interrupt is generated at operation 603, then the low power manager proceeds to operation 604 at which the application processor 200 configures a screen related to the music which is being played and displays the configured screen on the display unit.

In contrast, if the low power manager 110 determines that the proximity interrupt is not generated at operation 603, the low power manager 110 may continuously determine whether the proximity interrupt is generated at operation 603. More specifically, when the proximity interrupt is generated, the low power manager 110 transmits proximity data for configuring the screen related to the music which is being played to the application processor 200. Thereafter, the application processor 200 may configure a screen including music information containing an artist, a title, lyrics, and a play time related to the music which is being played and an interface controlling a music play and display the configured screen on the display unit 210. The low power manager may poll for an indication that the proximity interrupt is generated.

Referring to FIG. 7, a flowchart illustrating a process of displaying a screen for an application executed through a background according to another embodiment of the present disclosure is provided.

At operation 700, the portable terminal is in a state within which a particular application is executed.

At operation 701, the low power manager 110 determines whether a preset time has passed.

If the low power manager 110 determines that the preset time has passed at operation 701, then the low power manager 110 proceeds to operation 702.

In contrast, if the low power manager 110 determines that the preset time has not passed at operation 701, then the low power manager 110 may continuously determine whether the preset time has passed at operation 701. For example, the low power manager 110 may continuously poll for an indication that the preset time has passed.

At operation 702, the low power manager 110 switches a state of the portable terminal to a sleep mode.

At operation 703, the low power manager 110 drives the proximity detection sensor 240.

At operation 704, the low power manager 110 determines whether a proximity interrupt is generated.

If the low power manager 110 determines that the proximity interrupt is generated at operation 704, then the low power manager 110 proceeds to operation 705.

In contrast, if the low power manager 110 determines that the proximity interrupt is not generated at operation 704, then the low power manager 110 may continuously determine whether the proximity interrupt is generated at operation 704. For example, the low power manager 110 may continuously poll for an indication that the proximity interrupt is generated.

At operation 705, the application processor 200 may configure a screen related to the particular application which is being executed through the background, and display the configured screen on the display unit 210. More specifically, when the proximity interrupt is generated, the low power manager 110 transmits proximity data for configuring the screen related to the application which is being executed through the background to the application processor 200. Thereafter, the application processor 200 may configure a screen including a name, a description, detailed information of the application which is being executed through the background, and/or the like. Thereafter, the application processor 200 may display the configured screen on the display unit 210. For example, the screen related to the application which is being executed through the background may include progress status information such as a time for the data upload or download and a data capacity when the application is an application for data transmission/reception between one smart phone and another smart phone.

According to various embodiments of the present disclosure, the application which can be executed through the background includes an application for data transmission/reception and a pedometer application. Although the present disclosure has described the application for the data transmission/reception as an example, all applications executed through the background may be included.

It may be appreciated that the various embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded.

According to various embodiments of the present disclosure, the low power detection method may be implemented by a computer or a portable terminal including a controller and a memory, and it may be known that the memory is an example of a non-transitory machine-readable recording media suitable for storing a program or programs including instructions realizing various embodiments of the present disclosure.

Accordingly, various embodiments of the present disclosure includes a program for a code implementing the apparatus and method described in the appended claims of the specification and a non-transitory machine-readable storage medium (e.g., a non-transitory computer-readable storage medium, or the like) for storing the program. Moreover, such a program as described above can be electronically transferred through an arbitrary medium such as a communication signal transferred through cable or wireless connection. Accordingly, the present disclosure properly includes the equivalents thereto.

Further, the low power detection apparatus may receive a program from a program providing apparatus connected with the low power detection apparatus wirelessly or through a wire and store the received program. The program providing apparatus may include a memory for storing a program including instructions for allowing the low power detection apparatus to perform a preset content protecting method and information required for the content protecting method, a communication unit for performing wired or wireless communication with the low power detection apparatus, and a controller for transmitting the corresponding program to the low power detection apparatus according to a request of the low power detection apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a first sensor configured to detect an approach of an object to the electronic device;
a second sensor configured to detect an orientation of the electronic device; and a first processor configured to:
monitor the orientation of the electronic device based on detecting the approach of the object to the electronic device;
determine whether the orientation of the electronic device satisfies a preset condition;
determine whether the electronic device is motionless for a preset period of time based on the orientation of the electronic device; and
based on determining that the orientation of the electronic device satisfies the preset condition and that the electronic device is motionless for the preset period of time, provide information on the detected approach to a second processor of the electronic device.

2. The electronic device of claim 1, further comprising:
an interrupt unit that generates an interrupt for the first sensor,
wherein the first processor is further configured to:
drive the first sensor when a state of the electronic device is a sleep mode, and
drive the second sensor when the interrupt for the first sensor is generated through the interrupt unit.

3. The electronic device of claim 2, wherein the first processor is further configured to:
determine whether a next interrupt is generated when the electronic device is moved for the preset period of time after the driving of the motion detection first sensor is stopped.

4. The electronic device of claim 1, wherein the first processor is further configured to:
stop a driving of the first sensor when the orientation of the electronic device does not satisfy the preset condition.

5. The electronic device of claim 1, wherein the preset condition is used to determine whether values of x, y, and z axes of the electronic device are larger than or equal to a preset threshold.

6. The electronic device of claim 5, wherein the first processor is further configured to:
determine whether the electronic device is motionless for the preset period of time when the values of the x, y, and z axes of the portable terminal electronic device are larger than or equal to the preset threshold, and
stop a driving of the first sensor when the values of the x, y, and z axes of the electronic device are smaller than the preset threshold.

7. A method of displaying information in an electronic device, the method comprising:
detecting an approach of an object to the electronic device by a first sensor;
detecting an orientation of the electronic device by a second sensor;
monitoring the orientation of the electronic device based on detecting the approach of the object to the electronic device;
determining whether the orientation of the electronic device satisfies a preset condition;
determining whether the electronic device is motionless for a preset period of time based on the orientation of the electronic device; and
based on determining that the orientation of the electronic device satisfies the preset condition and that the electronic device is motionless for the preset period of time, providing information on the detected approach to a second processor of the electronic device.

8. The method of claim 7, further comprising:
driving the first sensor when a state of the electronic device is a sleep mode; and
driving the second sensor when an interrupt for the first sensor is generated.

9. The detection method of claim 8, further comprising:
determining whether a next interrupt is generated when the electronic device is moved for the preset period of time after the driving of the first sensor is stopped.

10. The method of claim 7, further comprising:
stopping a driving of the first sensor when the orientation of the electronic device does not satisfy the preset condition.

11. The method of claim 7, wherein the preset condition is used to determine whether values of x, y, and z axes of the electronic device are larger than or equal to a preset threshold.

12. The method of claim 11, wherein the determining whether the electronic device is motionless for the preset period of time comprises:
determining whether the electronic device is motionless for the preset period of time when the values of the x, y, and z axes of the electronic device are larger than or equal to the preset threshold; and
stopping a driving of the first sensor when the values of the x, y, and z axes of the electronic device are smaller than the preset threshold.

13. A non-transitory computer-readable storage medium storing instructions that, when executed, cause at least one processor to perform the method of claim 7.

* * * * *